United States Patent [19]

O'Connor

[11] 4,162,581
[45] Jul. 31, 1979

[54] EDUCATIONAL TEACHING AND STORAGE SYSTEM AND METHOD

[76] Inventor: Robert F. O'Connor, 20747 Londelius, Canoga Park, Calif. 91306

[21] Appl. No.: 789,137

[22] Filed: Apr. 20, 1977

[51] Int. Cl.$^2$ ............................................. G09B 1/06
[52] U.S. Cl. ................................. 35/8 R; 35/22 A; 35/26
[58] Field of Search .................. 35/8 R, 1, 22 A, 26; 211/65, 66; 248/110, 111

[56] References Cited

U.S. PATENT DOCUMENTS

| | | | |
|---|---|---|---|
| 1,385,375 | 7/1921 | Hormes | 211/65 UX |
| 2,377,100 | 5/1945 | Patterson | 35/22 A |
| 2,623,303 | 12/1952 | Mindel | 35/22 A |
| 2,935,206 | 5/1960 | Smith | 211/65 |
| 2,964,858 | 12/1960 | Rutherford | 35/26 X |
| 3,286,847 | 11/1966 | Le Blanc et al. | 211/65 |

*Primary Examiner*—William H. Grieb

[57] ABSTRACT

The improved educational teaching and storage system of the present invention comprises a rack having a plate with a plurality of staggered rows of spaced apertures extending therethrough, a plurality of art paintbrushes releasably disposed in the apertures, and indicia associated with the apertures and brushes to permit proper placement of the brushes in the apertures. The brushes can be easily dried, after use, while in the rack and can be stored indefinitely therein. The system is particularly applicable to art students and art classes, primarily classes of younger children, and the present method contemplates having the students withdraw the brushes from the rack and then replace them in the proper apertures for drying and storage, the placing being based on recognition of particular indicia. This improves hand-to-eye coordination and also trains mental skills. The indicia may be in the form of clues as to similar sizes and shapes, or color, or numbers or the like. In one embodiment, the brushes are provided with incidia in the form of removable shape-and-size-imparting sleeves fitted to the lower parts of the brushes. The system and method are simple, efficient and interesting.

3 Claims, 7 Drawing Figures

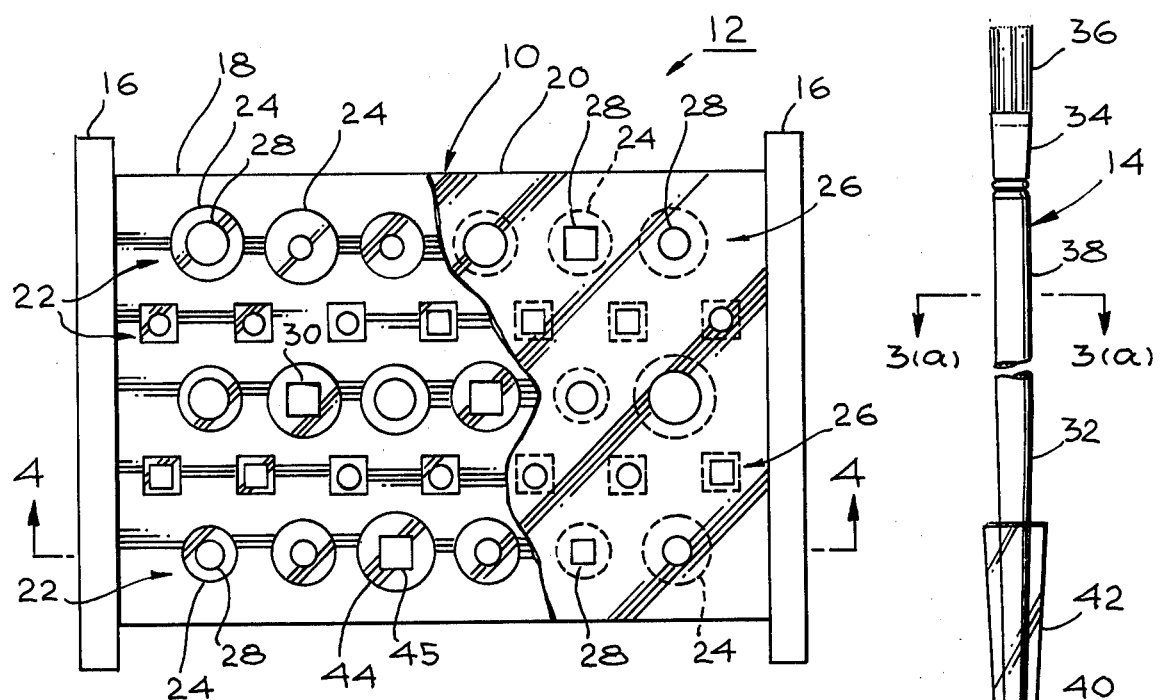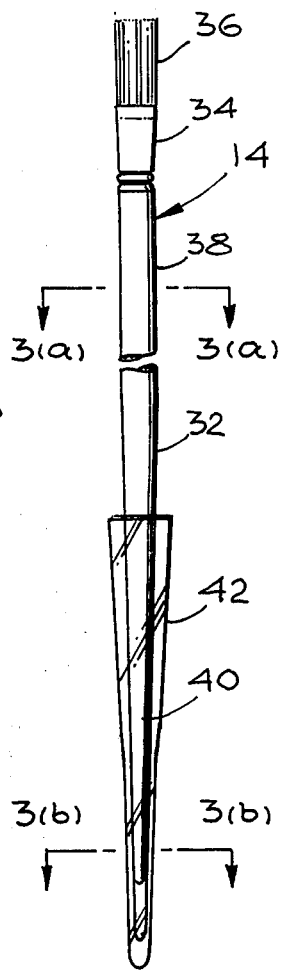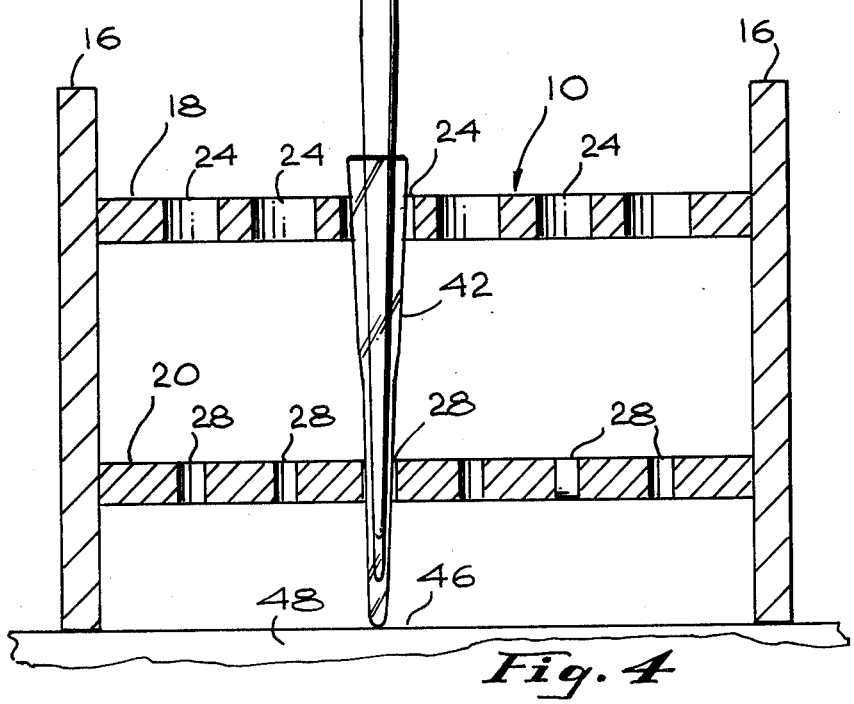

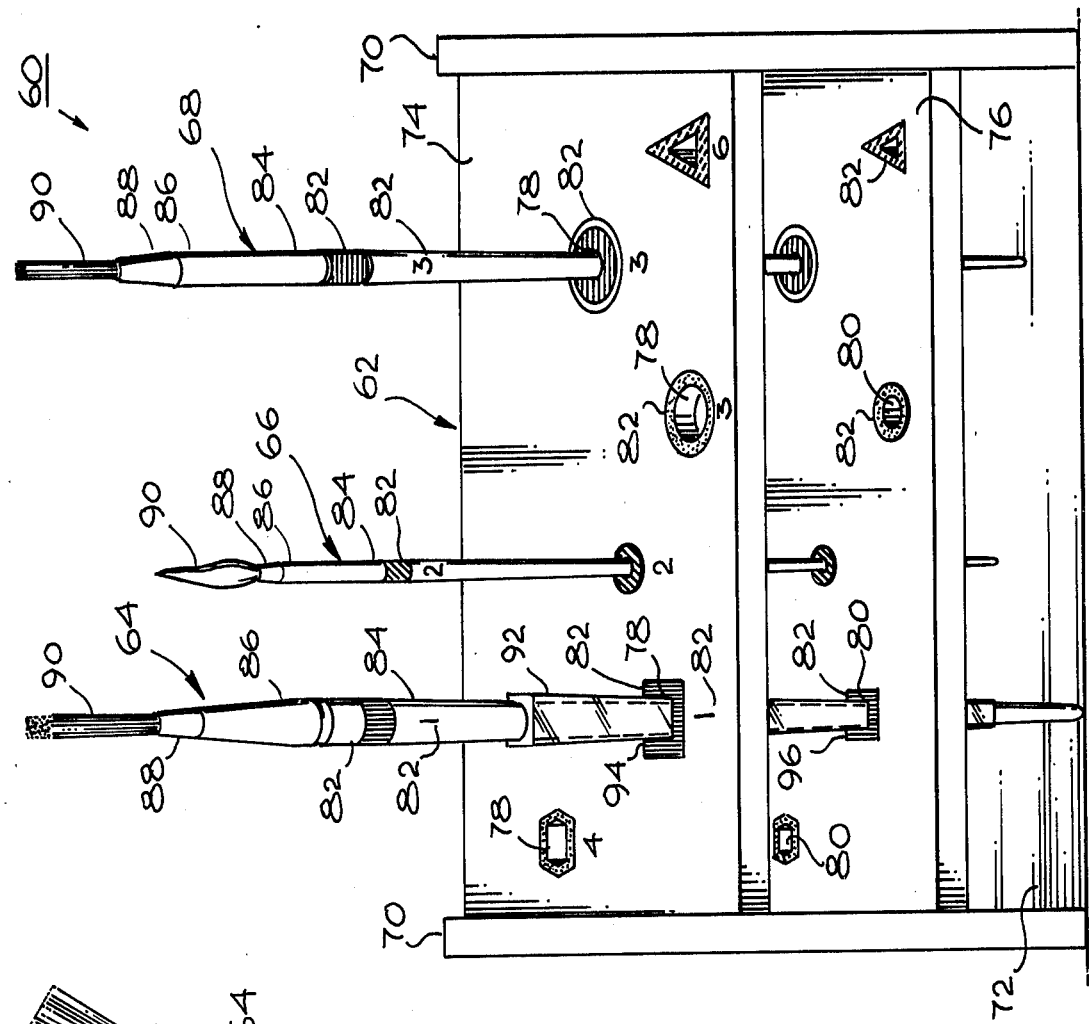
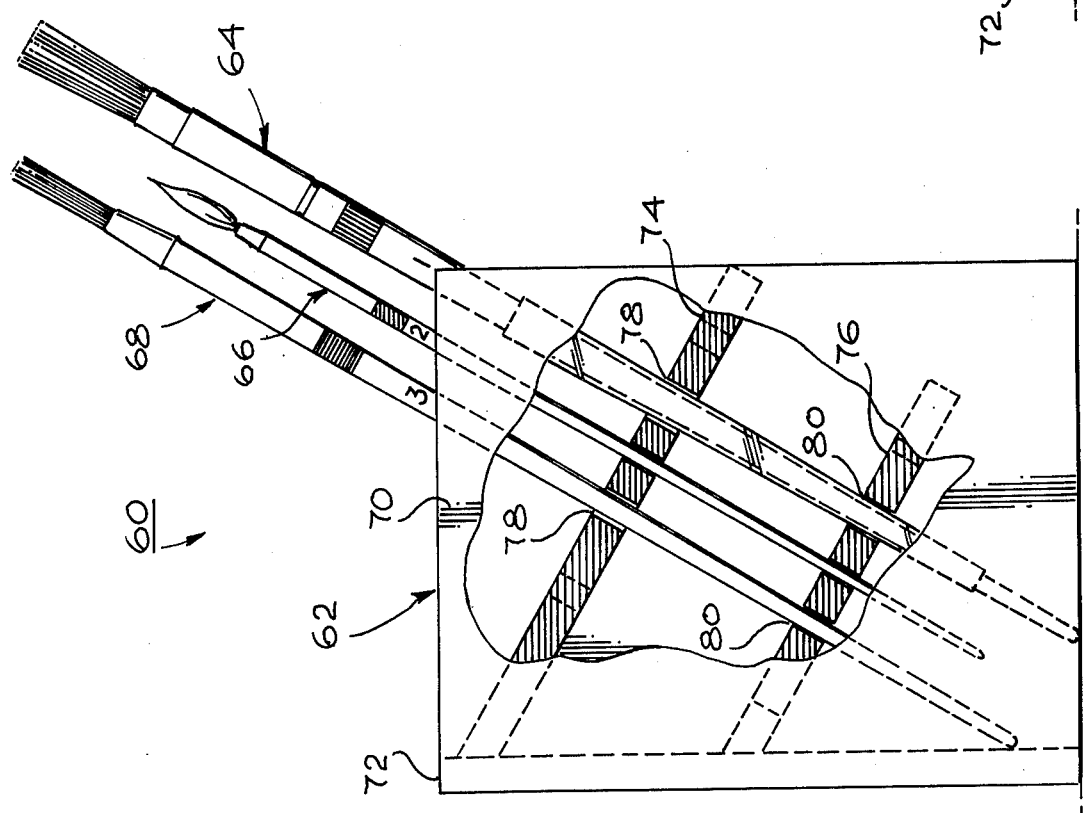

EDUCATIONAL TEACHING AND STORAGE SYSTEM AND METHOD

BACKGROUND OF THE INVENTION

1. Field of the Invention

The present invention generally relates to teaching and storage aids and more particularly to an improved system and method for teaching discrimination and hand-to-eye coordination and for conveniently drying and storing of art materials.

2. Prior Art

Art classes sometimes provide students with art materials such as paintbrushes, oil and watercolor paints and paintable surfaces. This is more frequently the case with classes where the students are very young. Normally, the paintbrushes for the art class are merely withdrawn from a storage box, used, and then cleaned and returned to, that is, piled in, the box in the wet condition. This may result in the brush heads drying in a distorted condition or not drying completely. It would be desirable to provide improved attractive means for properly drying and storing art paintbrushes after their use. It would also be desirable if such means were capable of providing the students with practice in discrimination and hand-to-eye coordination to augment the skills painting developed.

SUMMARY OF THE INVENTION

The foregoing needs are satisfied by the improved teaching and storing method and system of the present invention. The method and system are substantially as set forth in the Abstract above. Thus, a single or multilayer rack is provided which includes a plurality of spaced apertures, which might be in staggered rows, through which apertures a plurality of art paintbrushes are releasably held in the rack. A plurality of individual indicia, such as different numbers, colors, sizes and shapes can be associated with the apertures and brushes to relate certain brushes to certain apertures. In accordance with the present method, the brushes are withdrawn from the rack, used and then replaced in the rack to dry and for storage. Selection of the correct brush for the correct aperture is made with reference to the indicia.

In one embodiment, the particular desired shape and size of the lower portion of each brush is provided by a removable sleeve which slides over that lower portion. The upper finger gripping portion of each brush preferably is left unchanged.

In another embodiment a series of parallel tiers are provided in the rack, with aligned apertures. The apertures of the lower tier(s) may be, for example, smaller than those of the upper tier(s) or the same size. The tiers may also be tilted forwardly and downwardly to more easily present the apertures to full view and easier access.

The act of placing a given brush in its proper aperture in the rack is a useful and interesting exercise in hand-to-eye coordination and mental skill, particularly where the apertures are keyed to the brushes in an unusual attractive manner. Moreover, that act permits the brush to be easily dried out of contact with other brushes and to be easily and conveniently stored before reuse. The rack-brush system and method are simple, inexpensive and durable. Various features of the present invention are set forth in the following detailed description and accompanying drawings.

DRAWINGS

FIG. 1 is a schematic top plan view, partly broken away and partly in dotted outline of a first preferred embodiment of the rack portion of the improved teaching and storage system of the present invention;

FIG. 2 is a schematic fragmentary side elevation of a first preferred embodiment of one of the brushes utilized with the rack of FIG. 1 and forming part of the present system;

FIG. 3a is a schematic section taken along the section line 3a of FIG. 2;

FIG. 3b is a schematic section taken along the section line 3b of FIG. 2;

FIG. 4 is a schematic section taken along the section line 4—4 of FIG. 1, with the brush of FIG. 2 in the rack of FIG. 1;

FIG. 5 is a schematic side elevation, partly broken away and partly in dotted outline, of a second preferred embodiment of the improved system of the present invention; and, FIG. 6 is a schematic front elevation, partly in dotted outline, of the improved system of FIG. 5.

DETAILED DESCRIPTION

FIGS. 1–4

Now referring more particularly to FIG. 1 of the drawings, a first preferred embodiment of a rack forming part of the present invention is schematically depicted in top plan view. Thus, in FIG. 1, a rack 10 is shown which may be of plastic, wood, metal or the like and which forms part of system 12. System 12 also includes a plurality of brushes, one such brush 14 being shown in FIGS. 2 and 4.

Rack 10 includes a spaced pair of vertically disposed sidewalls 16 supporting therebetween a vertically spaced pair of flat horizontal plates 18 and 20 above the bottom of walls 16. Upper plate 18 is provided with five staggered rows 22 of apertures 24. Each aperture 24 is vertically disposed and extends through plate 18. Apertures 24 differ in size and shape, some being circular, while others are square. Lower plate 20 is also provided with staggered rows 26 of apertures 28. Apertures 28 are vertically aligned and centered with apertures 24 and generally are smaller than apertures 24, as shown in FIG. 1. Any given aperture 28 may be of different shape than its aligned aperture 24, as shown at point 30 in FIG. 1. Thus, a greater or lesser amount of visual perception, hand-to-eye coordination and manual dexterity may be required, depending on the shape and size of a given brush 14, to insert the brush down through an aperture 24 and also through its aligned aperture 28 so as to properly place it in rack 10.

It will be noted from FIG. 2, that brush 14 includes an elongated rearwardly tapered shaft 32 of wood, plastic, metal or the like, to the front end of which is connected, as by a metal band 34 or the like, a head 36 of bristles, the shape thereof depending on the particular use to which brush 14 is to be put, that is, as a watercolor or oil art brush or the like. The forward or finger-gripping region 38 of brush 14 is preferably circular in cross-section (FIG. 3a). The lower or rearward region 40 of brush shaft 32, while circular in cross-section, as is usually the case, may be fitted with a rearwardly removable friction fitting tapered sleeve 42 of transparent plastic, such as polyethylene, or other plastic, wood, metal or the like. Sleeve 42 imparts to region 40 its own size and shape. In this instance, as shown in FIG. 3b, that shape may be square and of a size to fit through both the large round aperture 24 and the small square aperture 28, as shown at points 44 and 45 in FIG. 1. Aperture 24 is large enough to accommodate region 38 of shaft 32 and aperture 28 is large enough to accommodate region 40.

Brush 14 can be releasably disposed in a vertical position in rack 10, as shown in FIG. 4, with the rear layer or small end of sleeve 42 resting on the top 46 of a table 48 or the like and bristle head 36 rising above rack 10 for easy drying. A plurality of brushes 14 (not shown), with or without sleeves 42, can be similarly inserted through other sets of the aligned apertures 24 and 28 in rack 10 and be releasably held therein for drying, storage, etc. System 12 thus is simple, inexpensive to make, easy to use and provides a superior drying and storage means for brushes 14.

Moreover, use of system 12 in accordance with the method of the present invention provides additional advantages. The method is practiced by withdrawing brushes 14 from rack 10, using the same and then returning brushes 14 to their proper places through proper apertures 24 and 28, based on visual perception of indicia, in this instance in the form of the size and shape of aligned sets of apertures 24 and 28, and of the cross-sections of brushes 14 at the appropriate points along the length of shafts 32. The method results in training mental and physical dexterity, with obvious advantages to the trainees.

FIGS. 5 and 6

Now referring more particularly to FIGS. 5 and 6, a second preferred embodiment is schematically depicted therein. Thus, in FIG. 5 is shown system 60 which includes rack 62 generally similar to rack 10, and brushes 64, 66 and 68 generally similar to brush 14. Rack 62 includes a pair of spaced vertical sidwalls 70 connected at their rear to a vertical rear wall 72 and connected on their inner surfaces to two downwardly and forwardly sloped, spaced, flat plates 74 and 76. Plates 74 and 76 are sloped down at an angle of, for example, about 30° from the horizontal. This is to facilitate simultaneous viewing from in front of rack 62 of apertures 78 of upper plate 74 and apertures 80 of lower plate 76 in order to select the proper set thereof for insertion of a given brush, such as one of brushes 64, 66 and 68, therein.

Apertures 78 are in staggered array, extend through plate 74 in a line generally perpendicular to the plane of plate 74 and are aligned and centered with apertures 80 in plate 76. Apertures 80 are perpendicular to and extend through plate 76. Apertures 78 and 80 are of various sizes and shapes to provide identifying indicia, apertures 80 being generally smaller than apertures 78. Apertures 78 and 80 also are bordered with further indicia 82 in the form of color coding, both apertures 78 and 80 in a single vertically aligned set having the same color coding. Apertures 78 are also numbered, as shown in FIG. 6, to provide additional identifying indicia 82. Indicia 82 (color coding and numbers) also appear on brushes 64, 66 and 68. Thus, each of these brushes is color coded and numbered to match a separate single one of the sets of apertures 78 and 80, as shown in FIG. 6, when the cross-sections of the particular brush and the shape and size of each of apertures 78 and 80 in the set are taken into consideration.

Each of brushes 64, 66 and 68 comprise an elongated rearwardly tapered down shaft 84 connected via a metal band 86 or the like to a head 88 of bristles 90. Brushes 64, 66 and 68 are of various sizes, but all are generally circular in cross-section. However, brush 64 has a removable sleeve 92 slidably engaged around its middle portion, which sleeve 92 changes the cross-sectional configuration of that middle portion to rectangular (FIG. 6) so that brush 64 is properly identifiable as fitting in the set of apertures 78 and 80 identified at points 94 and 96 in FIG. 6. The bottom ends of brushes 64, 66 and 68 are braced against rear wall 72 and heads 88 jut forwardly and upwardly from rack 62 for easy removal from and insertion in rack 62. Brushes 64, 66 and 68 are sufficiently far apart so that other brushes (not shown) can be racked therebetween without interfering with the drying and storage thereof. System 60 is utilizable by the present method in the same manner as described for system 12, and has the same advantages, including improved storage of paintbrushes. Moreover, the three types of indicia 82 present in system 80 further facilitate the educational process exercisable through the use of system 80.

Various modifications, changes, alterations and additions can be made in the improved system of the present invention and its components and parameters, and in the method of the present invention and its steps and parameters. All such modifications, changes, alterations and additions as are within the scope of the appended claims form part of the present invention.

What is claimed is:

1. An improved educational and storage teaching system, said system comprising, in combination:
   a. a rack having a plurality of spaced apertures extending therethrough;
   b. a plurality of art paintbrushes releasably disposed in said apertures;
   c. a plurality of individual indicia or coding mechanisms associated with said rack and said brushes and relating particular ones of said brushes to particular ones of said apertures for proper placement of said brushes in said apertures;
   d. wherein said apertures are of different sizes and shapes and wherein said brushes have cross-sections of complementary sizes and shapes; and,
   e. wherein said brushes bear shape and size imparting sleeves.

2. The improved system of claim wherein said sleeves are removable and are positioned below the finger-gripping portions of said brushes.

3. An improved educational teaching method associated with art painting, said method comprising:
   a. providing a rack having a plurality of spaced apertures extending therethrough and a plurality of art brushes releasably disposed in said apertures, said apertures and brushes having associated therewith a plurality of individual indicia or coding mechanisms which relate particular ones of said brushes to particular ones of said apertures;
   b. causing said brushes to be selected from said rack and used for art painting;
   c. thereafter causing said brushes, after use, to be returned to their proper apertures, based on comparison of said indicia or coding mechanisms, for drying and storage;
   d. wherein said indicia comprises various sizes and shapes of cross-sections of said brushes and complementary sizes and shapes of said apertures; and,
   e. wherein said cross-sections are adjusted by providing the lower portion of each brush with a removable size and shape-imparting sleeve.

* * * * *